(12) United States Patent
Zegveld et al.

(10) Patent No.: US 11,421,750 B2
(45) Date of Patent: Aug. 23, 2022

(54) GAS SPRING ASSEMBLIES AND METHODS OF ASSEMBLING SAME

(71) Applicant: Firestone Industrial Products Company, LLC, Nashville, TN (US)

(72) Inventors: Rutger Zegveld, Groesbeek (NL); Jan van Aartsen, Arnhem (NL)

(73) Assignee: Firestone Industrial Products Company, LLC, Nashville, TN (US)

( * ) Notice: Subject to any disclaimer, the term of this patent is extended or adjusted under 35 U.S.C. 154(b) by 234 days.

(21) Appl. No.: 16/957,456

(22) PCT Filed: Jan. 14, 2019

(86) PCT No.: PCT/US2019/013502
§ 371 (c)(1),
(2) Date: Jun. 24, 2020

(87) PCT Pub. No.: WO2019/143563
PCT Pub. Date: Jul. 25, 2019

(65) Prior Publication Data
US 2021/0364057 A1    Nov. 25, 2021

Related U.S. Application Data (60) Provisional application No. 62/619,440, filed on Jan. 19, 2018.

(51) Int. Cl.
F16F 9/04    (2006.01)

(52) U.S. Cl.
CPC .......... *F16F 9/0454* (2013.01); *F16F 9/0418* (2013.01); *F16F 2224/025* (2013.01); *F16F 2226/042* (2013.01); *F16F 2230/10* (2013.01)

(58) Field of Classification Search
CPC .... F16F 9/0454; F16F 9/0418; F16F 2230/10; F16F 2224/025; F16F 2226/042
See application file for complete search history.

(56) References Cited

U.S. PATENT DOCUMENTS 6,439,550 B1 * 8/2002 Koch ................. C08J 5/124
267/64.23
6,536,749 B1 * 3/2003 Luhmann ................. F16F 9/38
267/64.19

(Continued)

OTHER PUBLICATIONS

International Search Report and Written Opinion dated Apr. 23, 2019 for corresponding International Patent Application No. PCT/US2019/013502.

*Primary Examiner* — Vishal R Sahni
(74) *Attorney, Agent, or Firm* — Thomas R. Kingsbury; Matthew P. Dugan (57) ABSTRACT

Gas spring assemblies include a flexible spring member and a restraining cylinder. The flexible spring member includes a flexible wall extending longitudinally between first and second ends as well as peripherally about a longitudinal axis. The flexible wall includes an inside surface and an outside surface with the inside surface at least partially defining a spring chamber. The restraining cylinder includes a cylinder wall that extends longitudinally between first and second open ends as well as peripherally about the longitudinal axis. The cylinder wall includes an inside surface and an outside surface. The restraining cylinder is disposed longitudinally along the flexible spring member between the first and second ends thereof with at least a portion of the inside surface of the restraining cylinder permanently attached to the flexible wall along the outside surface thereof by way of a chemically-bonded joint. Methods of assembly are also included.

20 Claims, 5 Drawing Sheets

(56) References Cited

U.S. PATENT DOCUMENTS

| | | | |
|---|---|---|---|
| 10,557,511 B2* | 2/2020 | Priess | F16F 9/0454 |
| 10,752,071 B2* | 8/2020 | Gleu | F16F 9/05 |
| 2004/0026837 A1* | 2/2004 | Ferrer | F16F 9/38 |
| | | | 267/64.11 |
| 2009/0212472 A1 | 8/2009 | Adonakis | |
| 2012/0112392 A1 | 5/2012 | Oldenettel | |
| 2014/0027962 A1* | 1/2014 | Behmenburg | F16F 9/0409 |
| | | | 267/64.27 |
| 2014/0246817 A1* | 9/2014 | Bounds | F16F 9/049 |
| | | | 29/896.9 |
| 2014/0246818 A1 | 9/2014 | Smith | |
| 2015/0159725 A1 | 6/2015 | Gleu | |

\* cited by examiner

GAS SPRING ASSEMBLIES AND METHODS OF ASSEMBLING SAME

This application is the National Stage of International Application No. PCT/US2019/013502, filed on Jan. 14, 2019, which claims the benefit of U.S. Provisional Application No. 62/619,440, filed on Jan. 19, 2018, the subject matter of each of which is hereby incorporated herein by reference in its entirety.

BACKGROUND

The subject matter of the present disclosure broadly relates to the art of spring devices and, more particularly, to gas spring assemblies that include a restraining cylinder secured to a flexible spring member by way of a permanent, chemically-bonded joint. Methods of assembling such gas spring assemblies are also included.

The subject matter of the present disclosure may find particular application and use in conjunction with components for suspension systems of wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, it will be recognized and appreciated that the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring elements function accommodate forces and loads associated with the operation and use of the vehicle, and the plurality of damping devices are operative to dissipate undesired inputs and movements of the vehicle, particularly during dynamic operation thereof. Often, the spring elements are metal spring elements (e.g., coil springs, torsion springs) and the dampers are liquid-filled, hydraulic dampers that are secured between the sprung and unsprung masses of the vehicle separately from the spring elements. In other cases, however, gas spring assemblies can be used.

One factor that may be limiting the broader adoption and use of gas spring assemblies may relate to the challenge of balancing desired performance levels with size and/or space limitations associated with the particular application and/or use for which the gas spring assemblies are intended. As one example, motorized vehicles commonly include significant packaging and/or space limitations that can reduce the area that is available adjacent the gas spring assemblies. During use, gas spring assemblies can expand radially thereby increasing in size. Achieving desired performance characteristics of conventional gas spring assemblies while accommodating typical packaging and space constraints associated with motorized vehicle applications is an ongoing challenge.

Accordingly, it is desired to develop gas spring assemblies as well as suspension systems and methods of assembly that overcome the foregoing and/or other difficulties associated with known constructions, and/or which may otherwise advance the art of gas spring assemblies as well as suspension systems and methods including the same.

BRIEF SUMMARY

One example of a gas spring assembly in accordance with the subject matter of the present disclosure can include a flexible spring member and a restraining cylinder. The flexible spring member can have a longitudinal axis and can include a flexible wall that can extend longitudinally between first and second ends as well as peripherally about the longitudinal axis. The flexible wall can include an inside surface and an outside surface with the inside surface at least partially defining a spring chamber. The restraining cylinder can include a cylinder wall that can extend longitudinally between first and second open ends as well as peripherally about the longitudinal axis. The cylinder wall can include an inside surface and an outside surface. The restraining cylinder can be disposed longitudinally along the flexible spring member between the first and second ends thereof with at least a portion of one of the inside surface and the outside surface of the restraining cylinder permanently attached to the flexible wall along the outside surface thereof by way of a chemically-bonded joint.

One example of a method of manufacturing a gas spring assembly in accordance with the subject matter of the present disclosure can include providing a flexible spring member that has a longitudinal axis and that includes a flexible wall that extends longitudinally between first and second ends as well as peripherally about the longitudinal axis. The flexible wall can include an inside surface and an outside surface with the inside surface at least partially defining a spring chamber. The method can also include providing a restraining cylinder that includes a cylinder wall extending longitudinally between first and second open ends as well as peripherally about the longitudinal axis. The cylinder wall can include an inside surface and an outside surface. The method can further include positioning the restraining cylinder longitudinally along the flexible spring member between the first and second ends thereof such that at least a portion of the inside surface of the restraining cylinder is disposed in abutting engagement with a portion of the outside surface of the flexible wall. The method can also include forming a chemically-bonded joint between a portion of one of the inside surface and the outside surface of the cylinder wall and a portion of the outside surface of the flexible wall such that the restraining cylinder and the flexible spring member are permanently attached to one another.

DETAILED DESCRIPTION

Turning now to the drawings, it is to be understood that the showings are for purposes of illustrating examples of the subject matter of the present disclosure and that the drawings are not intended to be limiting. Additionally, it will be appreciated that the drawings are not to scale and that portions of certain features and/or elements may be exaggerated for purposes of clarity and/or ease of understanding.

Figure 1:
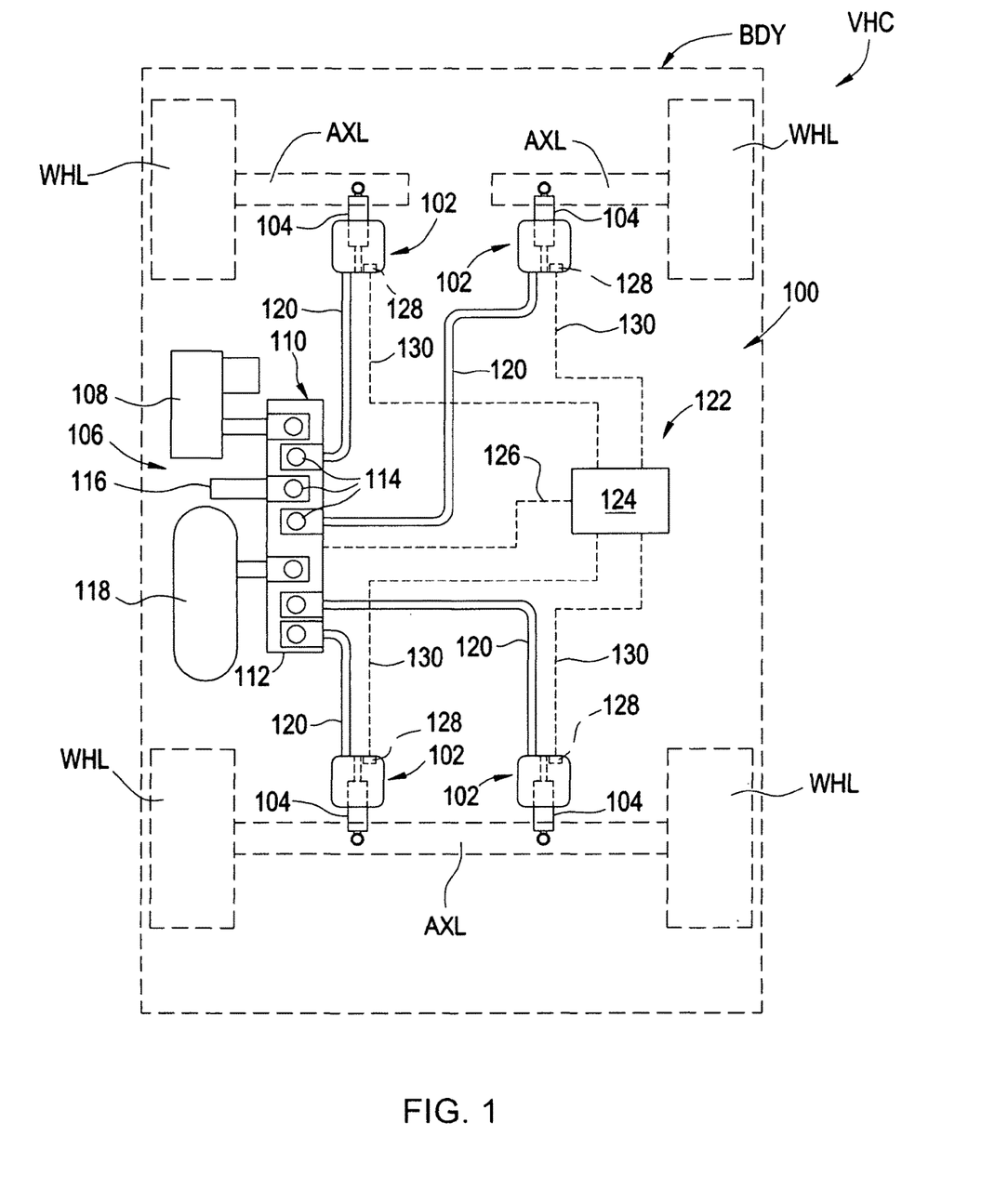
FIG. 1 is a schematic representation of one example of a suspension system of an associated vehicle including at least one gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include any combination spring and damper devices operatively disposed between the sprung and unsprung masses of the associated vehicle. For example, a suspension system can include one or more gas spring assemblies in accordance with the subject matter of the present disclosure operatively connected between the sprung and unsprung masses of the associated vehicle. Typically, one or more dampers (e.g., conventional shock absorbers or struts) can, optionally, be operatively connected between the sprung and unsprung masses. In some cases, the one or more dampers can be provided as separate components and secured between the sprung and unsprung masses independent from the one or more gas spring assemblies. In other cases, the one or more dampers can, optionally, be secured between the sprung and unsprung masses in conjunction with (e.g., co-axially with) the one or more gas spring assemblies, such as is shown in FIG. 1, for example.

In the arrangement shown in FIG. 1, suspension system 100 includes four gas spring assemblies 102, one of which is disposed toward each corner of the associated vehicle adjacent a corresponding wheel WHL. It will be appreciated, however, that any other suitable number of gas spring assemblies could alternately be used in any other configuration and/or arrangement. Additionally, it will be recognized that gas spring assemblies 102 are shown and described in connection with FIG. 1 as being of a rolling lobe-type construction. It is to be understood, however, that gas spring assemblies of other types, kinds and/or constructions could alternately be used without departing from the subject matter of the present disclosure.

As shown in FIG. 1, gas spring assemblies 102 are supported between axles AXL and body BDY of associated vehicle VHC. Suspension system 100 can also include one or more dampers that can be secured between an axle or other wheel-engaging member and the body in a suitable manner. As discussed above, the one or more dampers can be provided separately from gas spring assemblies 102 and secured between the axle and body independent of the gas spring assemblies. Alternately, one or more dampers 104 can be operatively connected between axles AXL and body BDY in conjunction with (e.g., co-axially with) gas spring assemblies 102, such as is shown in FIG. 1, for example.

Suspension system 100 can also include a pressurized gas system 106 operatively associated with the gas spring assemblies for selectively supplying pressurized gas (e.g., air) thereto and selectively transferring pressurized gas therefrom. In the exemplary embodiment shown in FIG. 1, pressurized gas system 106 includes a pressurized gas source, such as a compressor 108, for example, for generating pressurized air or other gases. A control device, such as a valve assembly 110, for example, is shown as being in communication with compressor 108 and can be of any suitable configuration or arrangement. In the exemplary embodiment shown, valve assembly 110 includes a valve block 112 with a plurality of valves 114 supported thereon. Valve assembly 110 can also, optionally, include a suitable exhaust, such as a muffler 116, for example, for venting pressurized gas from the system. Optionally, pressurized gas system 106 can also include a reservoir 118 in fluid communication with the compressor and/or valve assembly 110 and suitable for storing pressurized gas.

Valve assembly 110 is shown as being in communication with gas spring assemblies 102 through suitable gas transfer lines 120. As such, pressurized gas can be selectively transferred into and/or out of the gas springs through valve assembly 110 by selectively operating valves 114, such as to alter or maintain vehicle height at one or more corners of the vehicle, for example.

Suspension system 100 can also include a control system 122 that is capable of communication with any one or more systems and/or components (not shown) of vehicle VHC and/or suspension system 100, such as for selective operation and/or control thereof. Control system 122 can include a controller or electronic control unit (ECU) 124 communicatively coupled with compressor 108 and/or valve assembly 110, such as through a conductor or lead 126, for example, for selective operation and control thereof, which can include supplying and exhausting pressurized gas to and/or from gas spring assemblies 102. Controller 124 can be of any suitable type, kind and/or configuration.

Control system 122 can also, optionally, include one or more height (or distance) sensing devices 128, such as, for example, can be operatively associated with the gas spring assemblies and capable of outputting or otherwise generating data, signals and/or other communications having a relation to a height of the gas spring assemblies or a distance between other components of the vehicle. Height sensing devices 128 can be in communication with ECU 124, which can receive the height or distance signals therefrom. The height sensing devices can be in communication with ECU 124 in any suitable manner, such as through conductors or leads 130, for example. Additionally, it will be appreciated that the height sensing devices can be of any suitable type, kind and/or construction, such as may operate using sound, pressure, light and/or electromagnetic waves, for example.

Figure 2:
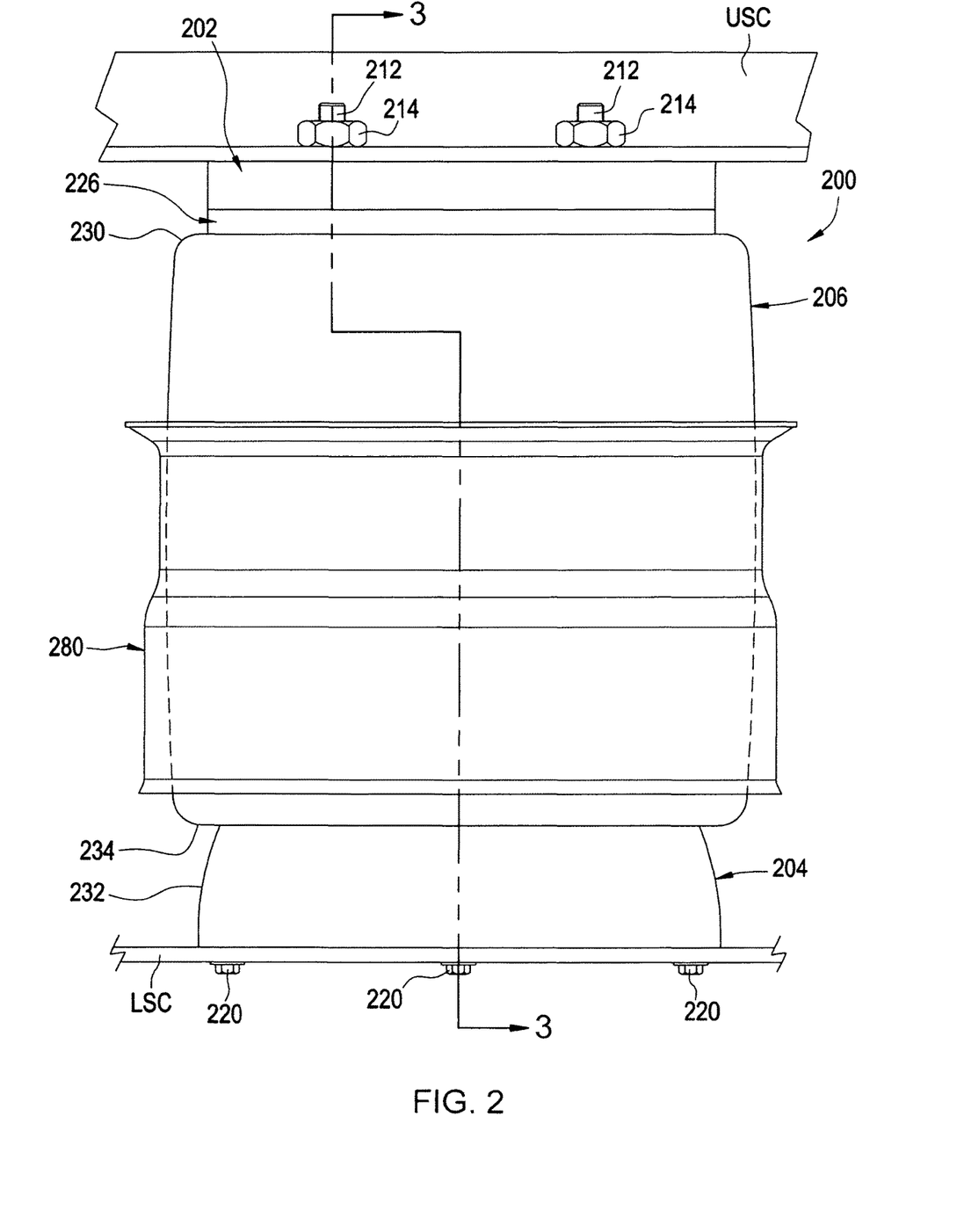
FIG. 2 is a side view of one example of a gas spring assembly in accordance with the subject matter of the present disclosure.
Figure 3:
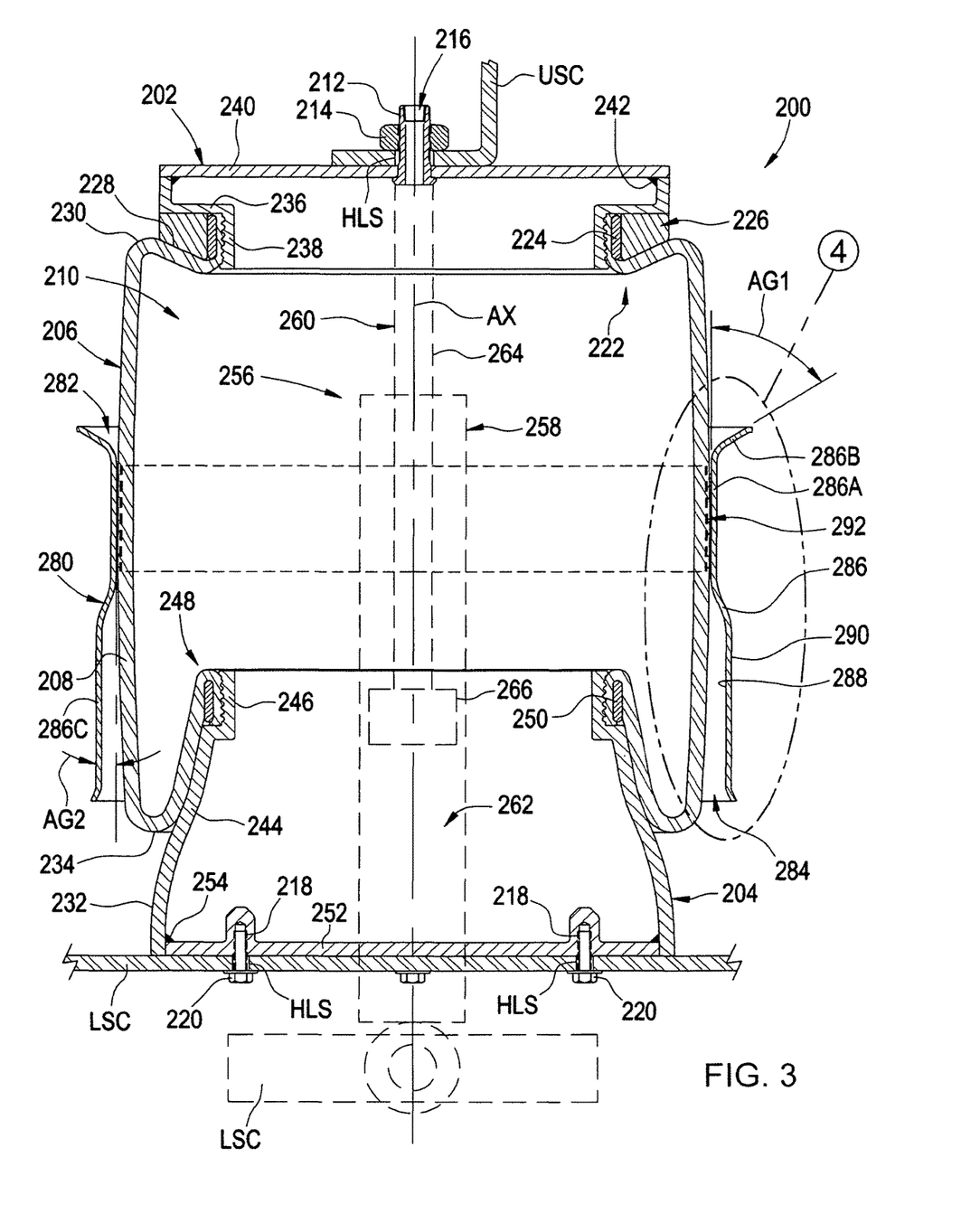
FIG. 3 is a cross-sectional side view of the exemplary gas spring assembly in FIG. 2 taken from along line 3-3 therein.

Having described an example of a suspension system (e.g., suspension system 100) that can include one or more gas spring assemblies in accordance with the subject matter of the present disclosure (e.g., gas spring assembly 102), one example of such a gas spring assembly 200 will now be described in connection with FIGS. 2-4. Gas spring assembly 200 can have a longitudinally-extending axis AX (FIG. 3) and can include one or more end members, such as an end member 202 and an end member 204 that is spaced longitudinally from end member 202. A flexible spring member 206 can include a flexible wall 208 that extends peripherally around axis AX and can be secured between the end members in a substantially fluid-tight manner such that a spring chamber 210 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 212, for example, can be included along end member 202. In some cases, the one or more securement devices (e.g., mounting studs 212) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 214 or other securement devices, for example. As an alternative to one or more of mounting studs 212, one or more threaded passages (e.g., blind passages and/or through passages) could be used in conjunction with a corresponding number of one or more threaded fasteners.

Additionally, a fluid communication port, such as a transfer passage 216 (FIG. 3), for example, can optionally be provided to permit fluid communication with spring chamber 210, such as may be used for transferring pressurized gas into and/or out of the spring chamber, for example. In the exemplary embodiment shown, transfer passage 216 extends through at least one of mounting studs 212 and is in fluid communication with spring chamber 210. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. End member 204 could include one or more securement features 218, such as threaded passages, for example. One or more securement devices 220, such as threaded fasteners, for example, can extend through mounting holes HLS and engage securement features 218 to secure end member 204 on or along lower structural component LSC. It will be appreciated, however, that any other suitable configuration and/or arrangement could alternately be used.

It will be appreciated that the one or more end members can be of any suitable type, kind, construction and/or configuration, and can be operatively connected or otherwise secured to the flexible wall in any suitable manner. In the exemplary arrangement shown in FIGS. 2-4, for example, end member 202 is of a type commonly referred to as a top cap or top plate and is secured to an end 222 of flexible spring member 206 using a retaining ring 224 that can be crimped or otherwise radially-inwardly deformed to capture at least a portion of flexible spring member 206 between the end member and the retaining ring. In some cases, a rate ring 226 can be disposed radially outward of retaining ring 224, and can include an outer end surface 228 along which a rolling lobe 230 can be formed along end 222 of flexible spring member 206. End member 204 is shown in the exemplary arrangement in FIGS. 2 and 3 as being of a type commonly referred to as a piston (or a roll-off piston) that has an outer surface 232 that abuttingly engages flexible spring member 206 such that a rolling lobe 234 is formed therealong. As gas spring assembly 200 is displaced between extended and collapsed conditions, rolling lobes 230 and 234 are respectively displaced along surfaces 228 and 232 in a conventional manner.

Additionally, end member 202 can include an outer side wall 236 with a mounting portion 238 along which end 222 of flexible spring member 206 is secured. In some cases, an end wall 240 can extend across outer side wall 236 to form a closed end of the end member. It will be appreciated that end wall 240 can be operatively connected to outer side wall 236 in any suitable manner, such as by way of a flowed-material joint 242 that forms a substantially fluid-tight connection therebetween. End member 204 can include a longitudinally-extending outer side wall 244 that extends peripherally about axis AX and at least partially defines outer surface 232. Outer side wall 244 can include a mounting portion 246 along which an end 248 of flexible spring member 206 can be secured such as by way of a retaining ring 250 that can be crimped or otherwise radially-inwardly deformed to capture at least a portion of flexible spring member 206 between the end member and the retaining ring. End member 204 can also include an end wall 252 that extends across outer side wall 244 generally transverse to axis AX. It will be appreciated that end wall 252 can be operatively connected to outer side wall 244 in any suitable manner, such as by way of a flowed-material joint 254 that forms a substantially fluid-tight connection therebetween.

It will be appreciated that, in use, gas spring assembly 200 can undergo changes in length (i.e., can be displaced between extended and collapsed conditions) as a suspension system (e.g., suspension system 100) within which one or more gas spring assemblies are installed dynamically moves to accommodate forces and/or inputs acting on a vehicle. As discussed above, a damper assembly 256 can, optionally, be operatively connected to gas spring assembly 200 and/or to one or more of the associated structural components (e.g., upper structural component USC and/or lower structural component LSC) either directly or indirectly such that the damper assembly is reciprocally displaced during dynamic use in operation of gas spring assembly 200. If provided, damper assembly 256 can include a damper housing 258 and a damper rod assembly 260 that is at least partially received in the damper housing. As identified in FIG. 3, damper housing 258 at least partially defines a damping chamber 262. Damper rod assembly 260 can include an elongated damper rod 264 and a damper piston 266 that is received within damping chamber 262 for reciprocal movement along the housing wall in a conventional manner. A quantity of damping fluid (not shown) can be disposed within damping chamber 262, and damper piston 266 can be displaced through the damping fluid to dissipate kinetic energy acting on gas spring assembly 200 and/or damper assembly 256. Though damper assembly 256 is shown and described herein as having a conventional construction in which a hydraulic fluid is contained within at least a portion of damping chamber 262, it will be recognized and appreciated that dampers of other types, kinds and/or constructions, such as pressurized gas or "air" dampers, for example, could be used without departing from the subject matter of the present disclosure.

It will be appreciated that flexible spring member 206 can be of any suitable type, kind and/or construction. For example, flexible wall 208 can include an outer or cover ply 268 that at least partially forms an outside surface 270 of flexible spring member 206. Flexible wall 208 can also include an inner or liner ply 272 that at least partially forms an inside surface 274 of the flexible spring member. In some cases, flexible wall 208 can further include one or more reinforcing plies 276 and 278 disposed between outside and inside surfaces 270 and 274. The one or more reinforcing plies can be of any suitable construction and/or configuration. For example, the one or more reinforcing plies can include one or more lengths of filament material that are at least partially embedded within the flexible wall. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle. It will be appreciated that flexible wall 208 can be formed from any suitable elastomeric material or combination of elastomeric materials. In a preferred arrangement, natural rubber materials and/or synthetic rubber materials can be used. In other cases, thermoplastic elastomers capable of forming a permanent, chemically-bonded joint could be used.

As discussed above, flexible spring member 206 can be operatively interconnected with components of the gas spring assembly in any suitable manner. For example, in some cases, one or both ends of the flexible spring member can, optionally, include a mounting bead or other connection feature, such as may include a reinforcing element (e.g., a bead wire) or other suitable component, for example. In other cases, the flexible spring member can take the form of an elongated sleeve with one or more cut ends along which the reinforcing cords of the flexible spring member are exposed, such as is shown in FIGS. 2 and 3, for example. In any case, flexible spring member 206 is operatively connected between end members 202 and 204 in a substantially fluid-tight manner such that spring chamber 210 is at least partially defined therebetween.

A gas spring assembly in accordance with the subject matter of the present disclosure, such as gas spring assemblies 102 and 200, for example, include an external sleeve or support that extends coextensively along at least a portion of the flexible spring member. In the exemplary arrangement shown in FIGS. 2-4, gas spring assembly 200 includes a restraining cylinder 280 that extends axially between opposing open ends 282 and 284. Restraining cylinder 280 includes a cylinder wall 286 that extends annularly about longitudinal axis AX. Cylinder wall 286 can include an inside surface 288 dimensioned to abuttingly engage outside surface 270 of flexible spring member 206, and an outside surface 290 facing radially outward.

Figure 4:
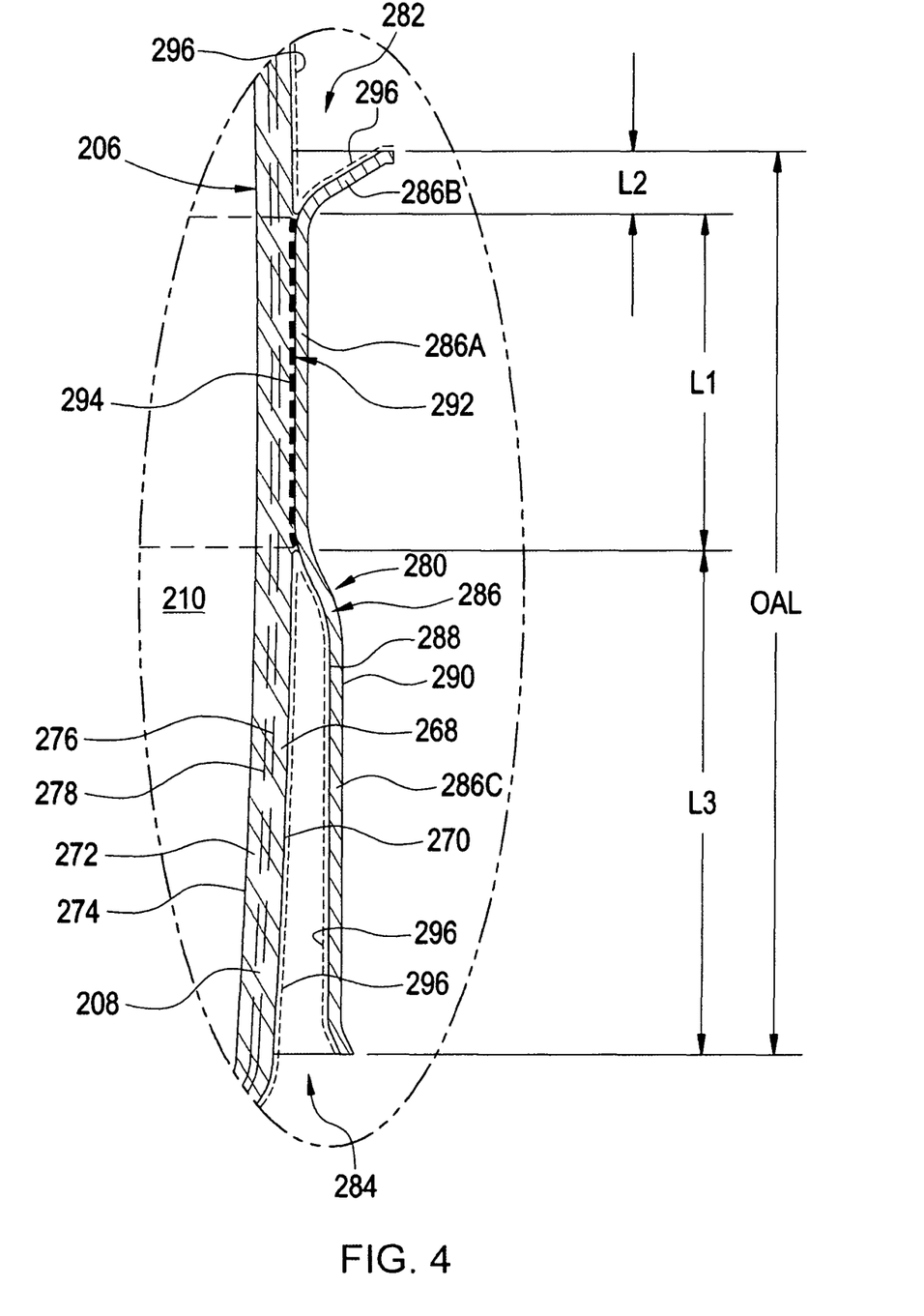
FIG. 4 is a greatly enlarged portion of the exemplary gas spring assembly in FIGS. 2 and 3 identified as Detail 4 in FIG. 3

Cylinder wall 286 is shown in FIG. 4 as having an overall length represented by reference dimension OAL. Cylinder wall 286 can include a wall portion 286A that is disposed in abutting engagement along outside surface 270 of flexible spring member 206. In some cases, wall portion 286A could have a length approximately equal to overall length OAL of the restraining cylinder. In other cases, wall portion 286A can have a length that is less than the overall length of the restraining cylinder, such as is represented in FIG. 4 by reference dimension L1, for example. In such cases, cylinder wall 286 can, optionally, include one or more additional wall portions. For example, cylinder wall 286 is shown in FIGS. 2-4 as including a wall portion 286B that extends longitudinally from along wall portion 286A in a direction toward end member 202. Additionally, or in the alternative, cylinder wall 286 can include a wall portion 286C that extends longitudinally from along wall portion 286A in a direction toward end member 204. If included, wall portions 286B and/or 286C will have a length that is less than the overall length of restraining cylinder 280, such as is respectively represented in FIG. 4 by reference dimensions L2 and L3. In a preferred arrangement, wall portion 286A can have an approximately cylindrical shape. If included, wall portions 286B and/or 286C can extend from wall portion 286A at an acute angle relative thereto, such as is represented in FIG. 3 by reference dimensions AG1 and AG2.

It will be appreciated that restraining cylinder 276 can be formed from any material or combination of materials with which a permanent connection or joint (i.e., a connection or joint that is inseparable without damage, destruction or material alteration of at least one of the component parts) can be formed with flexible spring member 206. In a preferred arrangement, a metal material can be used, such as steel or aluminum, for example. Additionally, it will be appreciated that restraining cylinder 280 can be attached to flexible spring member 206 by a chemically-bonded joint 292 of any type or kind suitable for forming a permanent connection between the restraining cylinder and flexible spring member (i.e., a connection or joint that is inseparable without damage, destruction or material alteration of at least one of the component parts). In some cases, such a chemically-bonded joint can be a cured-material joint that is at least partially formed through the curing of an initially green or otherwise uncured elastomeric material. In some cases, the cured-material joint can be a cross-linked-material joint that is at least partially formed through cross-linking of an elastomeric material. In some cases, the cross-linked-material joint can be a vulcanized-material joint that is at least partially formed through vulcanizing initially green or otherwise uncured natural rubber, synthetic rubber and/or other elastomeric materials.

In some cases, one or more coatings or other surface treatments can be applied on or along outside surface 270 of flexible spring member 206, inside surface 288 of restraining cylinder 280 and/or outside surface 290 of the restraining cylinder. As non-limiting examples, coatings such as bonding primers, tack adhesives and/or release (or masking) agents could be used. It will be appreciated that any one or more of such coatings or other surface treatments can be disposed on or along any one or more surfaces or surface portions of outside surface 270 of the flexible spring member and/or any one or more surfaces or surface portions of inside surface 288 of the restraining cylinder. For example, a coating of bonding primer that is operative to promote formation of a permanent, chemically-bonded joint could be disposed along at least the portion of inside surface 288 of wall portion 286A. Additionally, or in the alternative, a coating of tack adhesive that is operative to retain flexible wall 208 in abutting engagement with the inside surface of cylinder wall 286 prior to formation of a permanent, chemically-bonded joint could be disposed along at least the portion of inside surface 288 of wall portion 286A. Either or both of these coatings are represented in FIG. 4 by dashed line 294. Furthermore, or as a further alternative, a coating of release (or masking) agent that is operative to inhibit formation of a chemically-bonded joint between the flexible wall and the inside surface of the cylinder wall could be disposed along portions of outside surface 270 of flexible wall 208 that are axially outward of wall portion 286A and/or along the portions of inside surface 288 on wall portions 286B and/or 286C, if provided. Such coatings are collectively represented in FIG. 4 by dashed lines 296.

Figure 5:
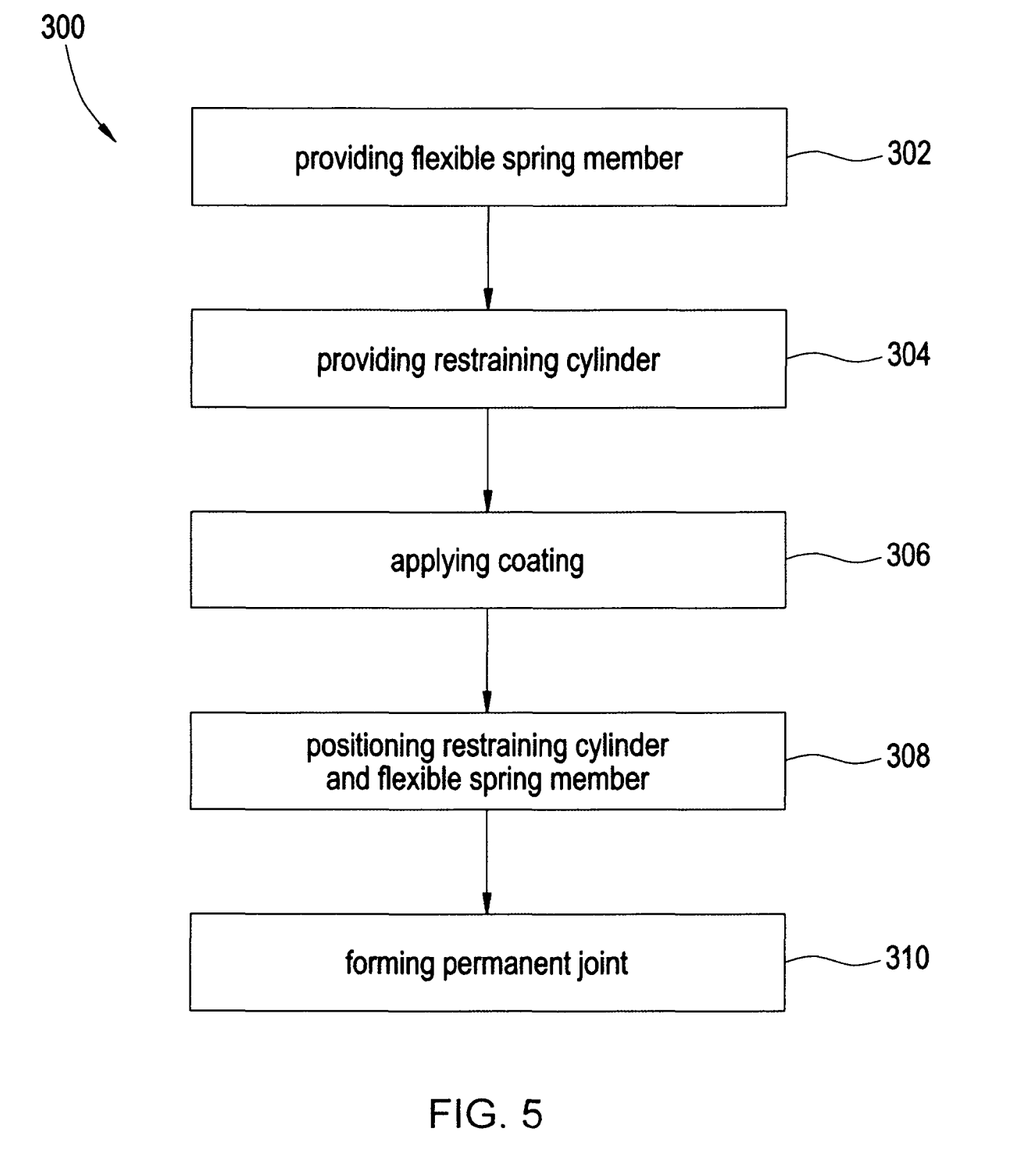
FIG. 5 is a graphical representation of one example of a method of assembly in accordance with the subject matter of the present disclosure.

One example of a method 300 of assembling a gas spring assembly in accordance with the subject matter of the present disclosure is graphically represented in FIG. 5. Method 300 can include an action of providing a flexible spring member, such as flexible spring member 206, for example, as is represented by item number 302. In a preferred arrangement, the flexible spring member can be provided in a green or otherwise uncured condition. Method 300 can also include an action of providing a restraining cylinder, such as restraining cylinder 280, for example, as is represented by item number 304. Method 300 can, optionally, include an action of applying one or more coatings or other treatments on or along a surface portion of either or both of the flexible spring member and the restraining cylinder, as is represented in FIG. 5 by item number 306. Method 300 can further include positioning the flexible spring member and the restraining cylinder in an approximately concentric, axially-coextensive arrangement with at least a portion of the outside surface of the flexible spring member and at least a portion of the inside surface of the restraining cylinder in abutting engagement with one another, as is represented by item number 308. Method 300 can also include forming a permanent, chemically-bonded joint between a portion of the flexible spring member and at least a portion of the restraining cylinder, such as is represented by item number 310.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible spring member having a longitudinal axis and including a flexible wall extending longitudinally between first and second ends and peripherally about said axis, said flexible wall including an inside surface and an outside surface with said inside surface at least partially defining a spring chamber;
a restraining cylinder including a cylinder wall extending longitudinally between first and second open ends and peripherally about said axis, said cylinder wall including an inside surface and an outside surface as well as a first wall portion and a second wall portion extending longitudinally from along said first wall portion, said restraining cylinder disposed longitudinally along said flexible spring member between said first and second ends thereof with at least a portion of one of said inside surface and said outside surface of said restraining cylinder permanently attached to said flexible wall along said outside surface thereof by way of a chemically-bonded joint with said chemically-bonded joint disposed along said first wall portion such that said flexible wall is separable from said second wall portion; and,
a first coating disposed along at least some of said inside surface of said second wall portion of said cylinder wall and/or at least some of said outside surface of said flexible wall in facing relation to said inside surface of said second wall portion of said cylinder wall such that said first coating is operative to inhibit formation of a chemically-bonded joint between said flexible wall and said inside surface of said second wall portion of said cylinder wall.

2. A gas spring assembly according to claim 1, wherein said flexible wall is at least partially formed from an elastomeric material, and said chemically-bonded joint includes a cured-material joint in which said elastomeric material cured along at least a portion of said inside surface of said restraining cylinder.

3. A gas spring assembly according to claim 2, wherein said cured-material joint is a cross-linked-material joint in which said elastomeric material is cross-linked along at least a portion of said inside surface of said restraining cylinder.

4. A gas spring assembly according to claim 3, wherein said elastomeric material is one of natural rubber and synthetic rubber, and said cross-linked-material joint is a vulcanized-material joint in which said one of said natural and synthetic rubber is vulcanized along at least a portion of said inside surface of said restraining cylinder.

5. A gas spring assembly according to claim 1, wherein said first wall portion is approximately cylindrical, and said second wall portion extends longitudinally from along said first wall portion at an acute angle relative to said first wall portion.

6. A gas spring assembly according to claim 1, wherein said first wall portion has an approximately linear cross-sectional profile and said second wall portion has one of a curved cross-sectional profile and an approximately linear cross-sectional profile.

7. A gas spring assembly according to claim 1, wherein said cylinder wall includes a third wall portion extending longitudinally from along said first wall portion in a direction opposite said second wall portion.

8. A gas spring assembly according to claim 1, wherein said restraining cylinder includes a second coating disposed along at least a portion of said inside surface of said first wall portion of said cylinder wall.

9. A gas spring assembly according to claim 8, wherein said second coating includes a bonding primer disposed along at least said inside surface of said first wall portion and operative to promote formation of said chemically-bonded joint.

10. A gas spring assembly according to claim 8, wherein said second coating includes a tack adhesive disposed along at least said inside surface of said first wall portion and operative to retain said flexible wall in abutting engagement with said inside surface of said first wall portion prior to formation of said chemically-bonded joint.

11. A gas spring assembly according to claim 1 further comprising:
a first end member secured across said first end of said flexible spring member such that a substantially fluid-tight seal is formed therebetween; and,
a second end member secured across said second end of said flexible spring member such that a substantially fluid-tight seal is formed therebetween with said spring chamber is at least partially defined by said flexible spring member between said first and second end members.

12. A suspension system comprising:
a gas spring assembly according to claim 1;
a pressurized gas source in fluid communication with said spring chamber of said gas spring assembly.

13. A method of manufacturing a gas spring assembly, said method comprising:
providing a flexible spring member having a longitudinal axis and including a flexible wall that extends longitudinally between first and second ends and peripherally about said axis, said flexible wall including an inside surface and an outside surface with said inside surface at least partially defining a spring chamber;
providing a restraining cylinder that includes a cylinder wall extending longitudinally between first and second open ends and peripherally about said axis, said cylinder wall including an inside surface and an outside surface as well as a first wall portion and a second wall portion extending longitudinally from along said first wall portion;
applying a first coating along at least some of said inside surface of said second wall portion of said cylinder wall and/or at least some of said outside surface of said flexible wall with said first coating inhibiting formation of a chemically-bonded joint between said flexible wall and said inside surface of said second wall portion of said cylinder wall;
positioning said restraining cylinder longitudinally along said flexible spring member between said first and second ends thereof such that at least a portion of said inside surface of said restraining cylinder is disposed in abutting engagement with a portion of said outside surface of said flexible wall; and,
forming a chemically-bonded joint between a portion of one of said inside surface and said outside surface along said first wall portion of said cylinder wall and a portion of said outside surface of said flexible wall such that said restraining cylinder and said flexible spring member are permanently attached to one another with said flexible wall remaining separable along said second wall portion of said cylinder wall.

14. A method according to claim 13, wherein said flexible wall is at least partially formed from an elastomeric material, and forming said chemically-bonded joint includes curing said elastomeric material together with said restraining cylinder such that a cured-material joint is formed by said flexible wall along at least a portion of said inside surface of said restraining cylinder.

15. A method according to claim 14, wherein said elastomeric material is an uncured elastomeric material, and positioning said restraining cylinder along said flexible spring member includes positioning said restraining cylinder along said uncured elastomeric material prior to curing said elastomeric material together with said restraining cylinder.

16. A method according to claim 14, wherein curing said elastomeric material includes cross-linking said elastomeric material such that a cross-linked-material joint is formed by said flexible wall along at least a portion of said inside surface of said restraining cylinder.

17. A method according to claim 16, wherein said elastomeric material is one of uncured natural rubber and uncured synthetic rubber, and cross-linking said elastomeric material includes vulcanizing said one of said natural and synthetic rubber such that a vulcanized-material joint is formed by said flexible wall along at least a portion of said inside surface of said restraining cylinder.

18. A method according to claim 13 further comprising applying a second coating along one of said outside surface of said flexible wall and said inside surface said first wall portion of said cylindrical wall with said first coating including one of a bonding primer and a tack adhesive.

19. A method according to claim 13 further comprising applying a second coating including a bonding primer along at least said inside surface of said first wall portion of said cylindrical wall that is operative to promote formation of said chemically-bonded joint.

20. A method according to claim 13 further comprising applying a second coating including a tack adhesive along at least said inside surface of said first wall portion of said cylindrical wall that is operative to retain said flexible wall in abutting engagement with said inside surface of said first wall portion prior to formation of said chemically-bonded joint.

\* \* \* \* \*